July 12, 1966 N. WEISS 3,260,075
FLARE PROTECTIVE CAP
Filed March 16, 1964
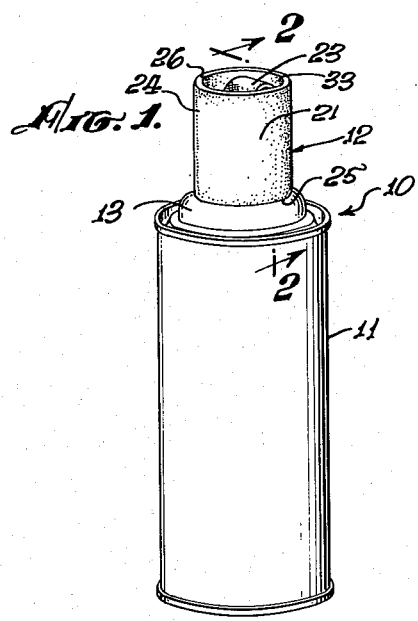
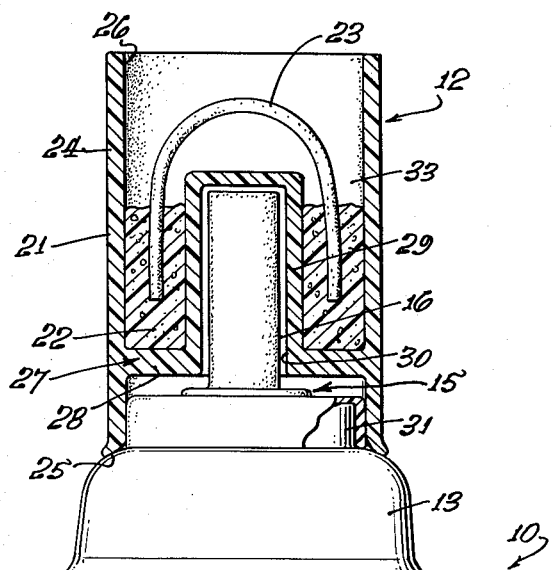
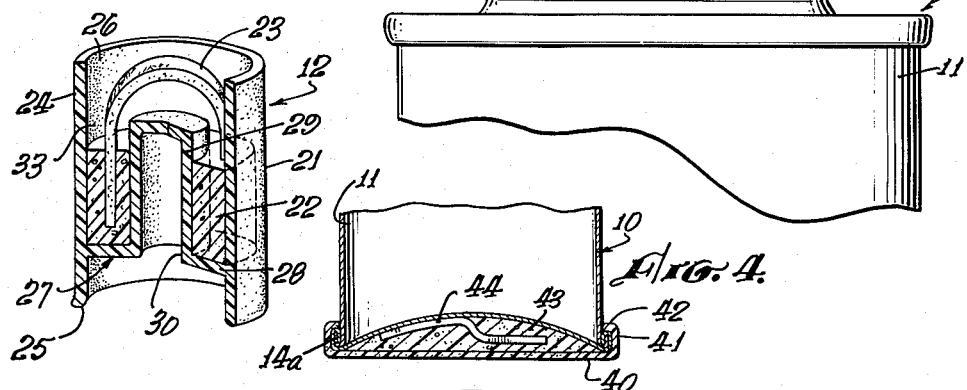
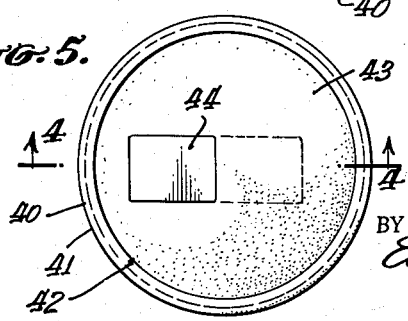
NORMAN WEISS,
INVENTOR.
BY Edmond F. Shanahan
ATTORNEY.

United States Patent Office 3,260,075
Patented July 12, 1966

3,260,075
FLARE PROTECTIVE CAP
Norman Weiss, Los Angeles, Calif., assignor to Susco Corporation, Northridge, Calif., a corporation of California
Filed Mar. 16, 1964, Ser. No. 352,275
4 Claims. (Cl. 67—21)

The present invention is an accessory for use with cans of pressurized fluid used for refilling and sealing automobile tires which have lost air as a result of puncture. The invention is an auxiliary cap which fits over the fluid discharge valve used on such cans and protects it from accidental opening by a protective structure which may be removed at the time of use, and ignited to serve as a warning flare.

A great variety of uses has been found for the pressurized can in which some useful fluid is contained, usually in association with an inert dispersing gas, partially liquified under pressure. An inexpensive plastic discharge valve permanently mounted in one end of the can conveniently discharges the contents, as required, when pressure is applied to the valve.

In addition to the widespread use of such cans for shaving lather, retouching lacquer, insecticide vapor, etc., such cans have recently come into widespread use for refilling of punctured tires. The dispersion gas itself serves as the refilling gas; in addition, a puncture-sealing liquid is incorporated with the refilling gas, and upon reaching the interior of the tire, it is usually capable of resealing and closing, at least temporarily, the average puncture (the puncturing nail or the like, having been removed).

While these inflating cans have met with almost instant and widespread acceptance, it has been quickly discovered that they are vulnerable to accidental discharge within a storage compartment of the automobile. Although it requires the application of some pressure to the discharge valve before its contents are released, users have learned that weeks of shaking and movement within an automobile trunk, or under an automobile seat, are quite likely to expose the valve to occasional shocks which result in momentary discharge. Moreover, automobile storage compartments frequently have sand or gravel present in them, and these particles sometimes jam the discharge valve in an open position. Many travelers who have packed a pressurized can of shaving cream in a suitcase or automobile trunk can testify that, despite care, and the seeming improbability of any application of pressure to the valve, it is a common experience to open the trunk or suitcase and find the shaving soap discharged over the entire contents. In the case of the pressurized can of tire inflation gas, the loss of pressurized gas is likely to go undetected until the moment of emergency at which it is needed.

It is a major object of the present invention to provide an improved protective cap for the tire inflation valve, which cap transmits all shocks to the top of the can itself, and protects the valve from accidental discharge, or from exposure to particles of sand or gravel which might jam it in an open position.

It is a second object of the invention to provide such a cap in which the cap structure is relatively large and heavy, and capable of softly absorbing a substantial blow without transmitting discharging impact to the valve it is protecting.

Safety experts are well aware that every motorist ought to carry a red flare with which to protect himself when his car is stalled on the highway, on account of a tire puncture, or for any reason. It appears, from general observation, however, that the great majority of private motorists, as distinguished from truck drivers, do not carry a warning flare. A flare has a particular value in case of tire puncture. A substantial number of motorists have been killed on the highway by other motorists who did not see them, while the former were changing tires on the left side of their automobiles.

The pressurized can of tire filling gas somewhat reduces this hazard simply because the time required to use it is much less than the time required to change a tire. However, even during the brief stop which occurs while refilling a punctured tire, the motorist is exposed to the danger of oncoming traffic while stooping to fill the tire from the pressurized can, and his car might be hit even if he is not. Of course, if he has one of the usual 15-minute flares, in addition to his pressurized can, he has much more than enough time to accomplish tire refilling. However, a flare burning for a much shorter period, which is assembled as a unit with his pressurized can, will give him the needed protection, although it has a much shorter burning period than the large standard flare. Moreover, when he purchases the disposable item, like the pressurized can, and obtains with it the flare that goes with the unit, he is more likely to have available and to use the safety precaution of a warning flare.

It is another important object of the invention to provide a flare which assembles as a unit with the pressurized tire filling can, can be sold with it, is unlikely to become separated from it during storage, and must be disassembled from the can before the can can be used. This last feature makes it practically inevitable that the motorist who wishes to use the pressurized can, and reads the instructions on it, will proceed, as a first step, to place his flare several feet behind his car and light it.

The foregoing and other objects of the invention will be best understood from a description of one preferred specific embodiment shown in the accompanying drawing, and described in the following paragraphs.

In the drawings:

FIGURE 1 is a perspective view of a pressurized can upon which is mounted a cap or cover constructed according to the present invention;

FIGURE 2 is an enlarged elevational view of the upper portion of the pressurized can of FIGURE 1, with the cap of the invention seen in cross section at a vertical plane through its axis, taken in the direction of the arrows 2—2 of FIGURE 1;

FIGURE 3 is a perspective view of the cap of FIGURES 1 and 2, with a sector portion cut away to reveal the general construction;

FIGURE 4 is a cross sectional view of the lower portion of the pressurized can of FIGURES 1 and 2 taken at a vertical plane through the axis of the can, to reveal the packaging of an auxiliary bottom flare; and, FIGURE 5 is a plan view of the flare bottom of FIGURE 4, after it has been removed from assembly with FIGURE 4, the location of the FIGURE 4 cross section being indicated by the arrows 4—4.

In FIGURE 1, the entire assembly of a pressurized can 11 and a cover 12 is designated generally by the numeral 10.

The pressure can 11 is of typical construction, being designed with a reinforced valve-receiving structure, such as the dome 13, at the upper end, and the concave bottom 14 as seen in the fragmentary sectional view of FIGURE 4.

The enlarged view of FIGURE 2 shows that the upper end 13 is surmounted by a typical plastic discharge valve 15, hermetically sealed to dome 13, and having an upstanding tubular discharge stem 16. The discharge stem 16 discharges the pressurized fluid from within the can 11 by applying the stem 16 to the valve of the tire and pressing down. There are a variety of such discharge valves on the market, some of which actually being discharge even if the discharging force is applied only to the exterior of the stem 16, or even the base portion 15.

FIGURES 2 and 3 reveal that the flare-cover 12 is comprised of a container 21 which is partially filled with a suitable solid flare fuel such as wax 22, associated with a wick 23.

It will be seen that the container 21 is formed with an outer tubular flare housing 24, which is open at both its lower end 25 and its upper end 26.

However, lower end 25 is separated from upper end 26 by a partition 27, formed in the specific embodiment with a transverse, horizontal disc portion 28 with a centrally located inverted cap 29 open at the lower end 30 to accommodate valve stem 16. It will be seen that the lower end 25 closely and tightly grips the uppermost portion of the can 11, resting on dome 13, and bearing on the downwardly depending parts of valve structure 15, which enclose the topmost portion of the can as indicated at 31.

The partition 27 is located in the lowermost part of the tubular flare housing 26, in order to provide a maximum flare chamber in the annular space 33 between the exterior of upstanding cap 29 and the interior of tubular flare housing 26, for the accommodation of the annular mass of wax or other flare fuel 22. On the other hand, the partition 27 and cap 29 must be spaced slightly away from the valve 15 and its stem 16, so that there is no danger of transmission to the valve of impacts sustained by the flare-cover 12.

The preferred specific embodiment of the invention illustrated in FIGURES 2 and 3 has a combination of materials and dimensions which provide a maximum of effectiveness both as protective cover and as warning flare.

The cap 12 is constructed with the upper end 26 of flare housing 24 extending well above the valve protecting cap 29, which serves both to shield the cap 29 from any external destructive forces, and also acts as a windshield for the flare-cap 12 when wick 23 is ignited.

Although the wax charge 22 has no great strength, its bulk and solidity impart a cushioning charcter to the flare cap which enhances its ability to protect the stem 16 in the event a tire iron or jack is dropped directly on cap 12, or it is otherwise subjected to severe shock or crushing.

Even the wick 23 is preferably of a web type inverted over the protective cap 29 and shielding its exposed end, yet providing ready means for igniting the flare-cap 12, and burning into both sides of the wax fuel 22.

It is a preferred specific embodiment of the invention that the flare housing 24 be made of a red translucent plastic so that the burning of wick 23 and wax 22 produces a light which is at least partially red in color.

Another feature of the preferred embodiment is that the entire cap 12 be combustible, but preferably in a range of combustibility adapted to prolong its burning life. Wick 23 must be readily ignitable, but the wax 22 may be somewhat slow burning with respect to wick 23. Preferably, the combustible material of the flare housing 24 and partition 27 should be substantially slower burning than wax 22, and be consumed only slowly as flames from wax 22 play upon the interior wall surface of the upper end 26, and the exposed parts of cap 29.

It is desirable to augment the flare-cap 12 with a second short-time flare incorporated in the same assembly. In the present invention, FIGURES 4 and 5 illustrate a second flare made of the same combination of materials as the cover 12, assembled with the bottom of the can 11, into the concave recess under concave bottom 14.

It is seen that a flare dish 40, made of suitable combustible plastic, is provided with a rim 41 having an inturned edge 42 to fit around the bead 14a at the bottom of can 11. The dish 40 contains a convex mound of wax 43 which closely fits under bottom 14, and may be ignited by a wick 44, seen in cross section in FIGURE 4, and with the exposed portion visible in the plan view of FIGURE 5.

Although I have described the preferred specific embodiments of FIGURES 1 through 5 in considerable detail, it will be understood that I do not wish the scope of the invention which I claim by the details illustrated in the foregoing specification, but claim as falling within the scope of my invention all modifications and variations of design which fall within the scope of the following appended claims.

Having thus described my invention, what I claim as new and desire to secure by Letters Patent is:

1. A combination warning flare and protective housing for co-operative assembly with a pressurized fluid container having an upstanding discharge valve means, which combination comprises:
    a tubular flare housing having a lower opening for tightly receiving the end of said container upon which said valve is mounted, and an upper opening;
    a transverse partition in said flare housing, said partition including an upstanding protective valve housing formed to enclose said valve without contacting it;
    a flare fuel charge comprised of combustible solid material received in said flare housing above said partition;
    and a wick received into the body of said flare fuel.

2. A combination warning flare and protective housing for co-operative assembly with a pressurized fluid container having an upstanding discharge valve means, which combination comprises:
    a tubular flare housing having a lower opening for tightly receiving the end of said container upon which said valve is mounted, and an upper opening spaced above the upper end of said valve;
    a transverse partition in said flare housing, said partition including an upstanding protective valve housing formed to enclose said valve without contacting it, with the exterior of the upper end of said valve housing being spaced below the upper end opening of said flare housing, and the exterior walls of said valve housing and the interior walls of said flare housing being spaced to provide a chamber above said partition;
    a flare fuel charge comprised of combustible solid material received in said chamber;
    and a wick of combustible fabric received into the body of said flare fuel.

3. A combination warning flare and protective housing for co-operative assembly with a pressurized fluid container having an upstanding discharge valve means, which combination comprises:
    a tubular flare housing having a lower opening for tightly receiving the end of said container upon which said valve is mounted, and an upper opening spaced above the upper end of said valve;
    a transverse partition in said flare housing, said partition including an upstanding protective valve housing formed to enclose said valve without contacting it, with the exterior of the upper end of said valve housing being spaced below the upper end opening of said flare housing, and the exterior walls of said valve housing and the interior walls of said flare housing being spaced to provide an annular chamber above said partition;
    a flare fuel charge comprised of combustible solid material received in said annular chamber;
    and a wick of combustible fabric received into the body of said flare fuel.

4. A combination warning flare and protective housing for co-operative assembly with a pressurized fluid container having an upstanding discharge valve means, which combination comprises:
    a tubular flare housing made of red translucent combustible material, said housing having a lower opening for tightly receiving the end of said container upon which said valve is mounted, and an upper opening spaced above the upper end of said valve;

a transverse partition in said flare housing, said partition including an upstanding protective valve housing formed to enclose said valve without contacting it, with the exterior of the upper end of said valve housing being spaced below the upper end opening of said flare housing, and the exterior walls of said valve housing and the interior walls of said flare housing being spaced to provide an annular chamber above said partition;

a flare fuel charge comprised of combustible solid material received in said annular chamber;

and a wick of combustible fabric received into the body of said flare fuel on opposite sides of said valve housing, and having an exposed ignition portion accessible for ignition at said upper end opening of said flare housing.

References Cited by the Examiner
UNITED STATES PATENTS

| | | | |
|---|---|---|---|
| 1,961,629 | 6/1934 | Bolser | 67—55 |
| 2,120,255 | 6/1938 | McCloskey | 67—55 |
| 2,138,622 | 11/1938 | Bolser | 67—55 |
| 2,713,256 | 7/1955 | Oesterle et al. | 67—21 |
| 2,771,763 | 11/1956 | Kracauer | 67—21 |

FREDERICK L. MATTESON, JR., *Primary Examiner.*

ROBERT A. DUA, *Assistant Examiner.*